United States Patent [19]

Trueg

[11] Patent Number: 4,815,395
[45] Date of Patent: Mar. 28, 1989

[54] TILT-TOP TABLE
[75] Inventor: Larry Trueg, Wolf Point, Mont.
[73] Assignee: Wood's Powr-Grip Co., Wolf Point, Mont.
[21] Appl. No.: 148,760
[22] Filed: Jan. 26, 1988
[51] Int. Cl.⁴ .............................................. A47B 3/00
[52] U.S. Cl. .................................. 108/112; 108/111; 108/115; 269/289 MR; 269/910
[58] Field of Search .............. 108/111, 113, 115, 124, 108/112; 269/910, 289 MR

[56] References Cited

U.S. PATENT DOCUMENTS

| | | | |
|---|---|---|---|
| 3,598,390 | 8/1971 | Armitage | 269/910 |
| 4,136,622 | 1/1979 | Bue et al. | 108/115 X |
| 4,164,346 | 8/1979 | Sickler | 269/289 MR |
| 4,202,278 | 5/1980 | Wadenhad | 108/111 X |

FOREIGN PATENT DOCUMENTS 2436382 2/1976 Fed. Rep. of Germany ...... 108/111

OTHER PUBLICATIONS

Bremner Glass Equipment Pty. Ltd. Brochure, p. 12. "Handling Equipment for the Glass Industry", Perfect Tinning & Chemical Co., Inc. brochure, Lancaster, TX, p. 5, (date prior to 1/26/87).

Primary Examiner—James T. McCall
Attorney, Agent, or Firm—Wells, St. John & Roberts

[57] ABSTRACT

A tilt-top table is described having features that facilitate tilting a top frame between an upright storage and transport condition and a horizontal operative condition. The top frame is connected to a primary support platform and a secondary support brace by a linkage arrangement that facilitates independent pivotal motion of the secondary support brace and the tilt-top frame between upright storage and transport conditions and substantially horizontal, operative conditions. The secondary support brace will pivot from a location above and within the width dimension of the primary support platform to an outboard position, upright to receive and partially support the tilt-top frame when pivoted to the horizontal orientation. The secondary support brace, when pivoted to the outboard orientation, also situates the pivot axis for one set of legs of the linkage to facilitate progressive weight transfer of the tilt-top between the platform and secondary support braces as the top progresses from the upright to the horizontal orientation. The tilt-top frame and a workpiece thereon may be manually pivoted without the use of actuators or counterweights, between the upright storage and transport position and the horizontal operative position.

13 Claims, 4 Drawing Sheets

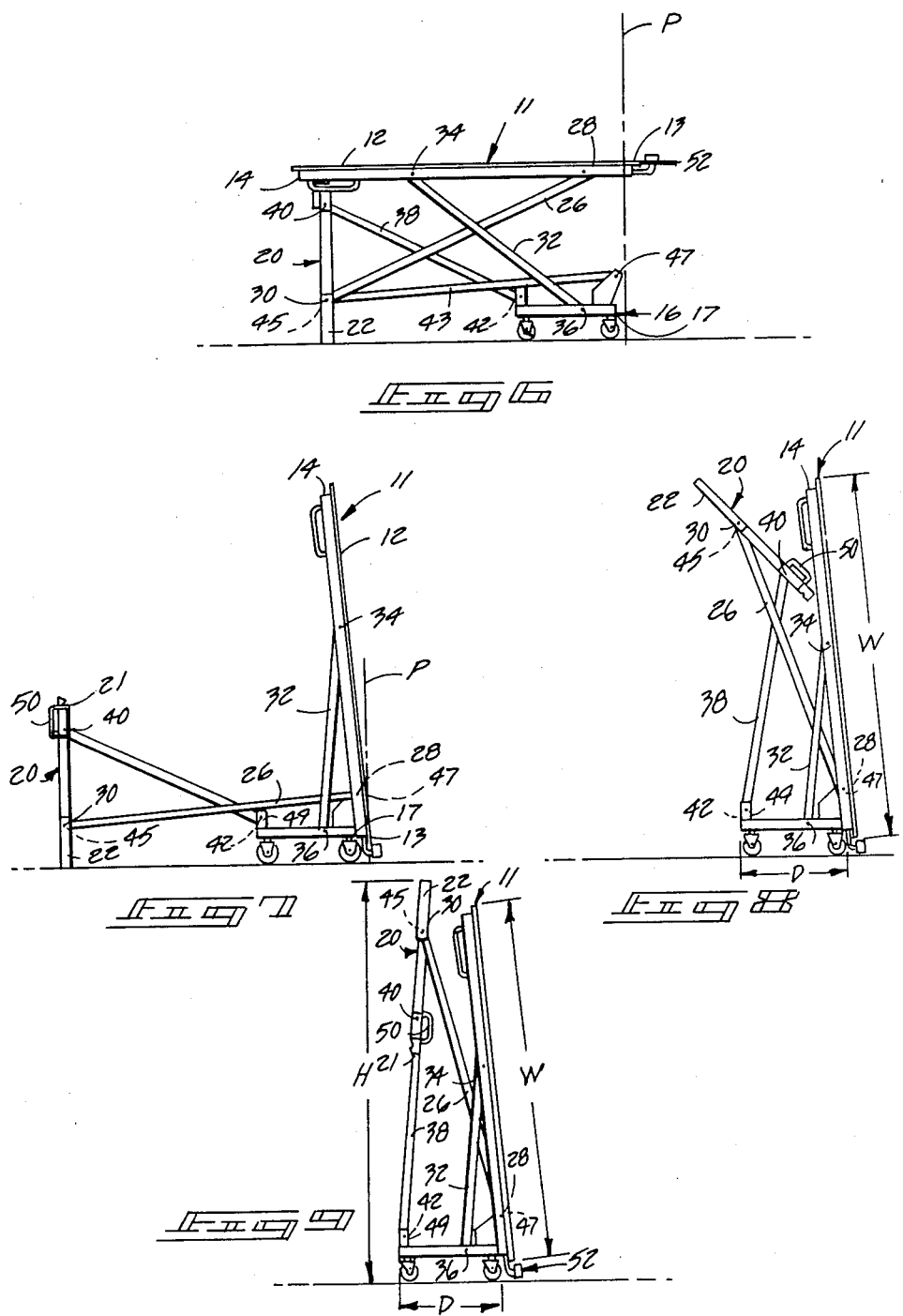

TILT-TOP TABLE

TECHNICAL FIELD

The present invention relates to tables having selectively tiltable tops and particularly those for supporting and transporting large flat work pieces such as plate glass.

BACKGROUND OF THE INVENTION

Various forms of tilt-top tables have been devised for working with flat sheet materials. Some employ counterbalance action to facilitate tilting. Others use complex and expensive hydraulic cylinders or electric actuators to move the table top.

Another form of tilt-top table, produced by Bremner Glass Equipment Pty. Limited of Victoria, Australia includes a "scissors" support frame linkage that facilitates tilting movement of its table top between upright and horizontal positions. The particular geometry of the linkage facilitates tilting motion without need of expensive actuators or heavy counterbalances. The linkage extends between the table top and a large rectangular base frame that is wheel suported for transport. The width dimension of the base frame is only slightly less than the corresponding width dimension of the table top. The base frame is necessarily wide to provide pivot points for the scissors linkage so the linkage geometry will permit a relatively smooth, balanced weight transfer of the table top as it is shifted between the horizontal and upright positions. The weight transfer advantages enable a user to easily shift the table top and a heavy sheet of glass between the vertical and horizontal positions.

The "Bremner" tilt-top table has thus had favorable impact in areas requiring handling of heavy sheet material, especially glass. It is desirable, however, to improve portability of such tables and the ability to load and unload sheet material onto and off from the table top.

None of the known forms of tilt top tables combine tilting features with the ability to fold a base support so the table may be stored easily, moved down narrow aisles, loaded into a small truck, carried in an elevator, rolled on a narrow ramp, or wheeled to a convenient refuse area for tilting and cleaning.

It is therefore a primary object of this invention to provide a table which combines a scissors tilt action with a narrow base support and brace assembly that can be folded to substantially reduce the overall width dimension of the entire unit to facilitate loading, storage and transport through confined areas, as for example a standard 80" by 28" doorway.

Another object is to provide such a tilt-top table that can be easily lifted from an upright storage and transport condition to a substantially horizontal operative condition without the use of counterweights, hydraulic or electric actuators, or the requirements of a substantial base support to carry the weight of the table top as it is shifted from the upright position to the horizontal operative position.

These and other objects and advantages will become apparent upon reading the following detailed description, which, taken with the accompanying drawings, disclose a preferred form of the present invention.

BRIEF DESCRIPTION OF THE DRAWINGS

The preferred embodiment of the invention is illustrated in the accompanying drawings, in which:

FIGS. 6–9 are operational views illustrating a sequence of steps by which the table and frame assembly are pivoted to and from the horizontal operative position shown in FIG. 6 and the upright storage and transport condition shown in FIG. 9.

DETAILED DESCRIPTION OF THE PREFERRED EMBODIMENT

Figure 1:
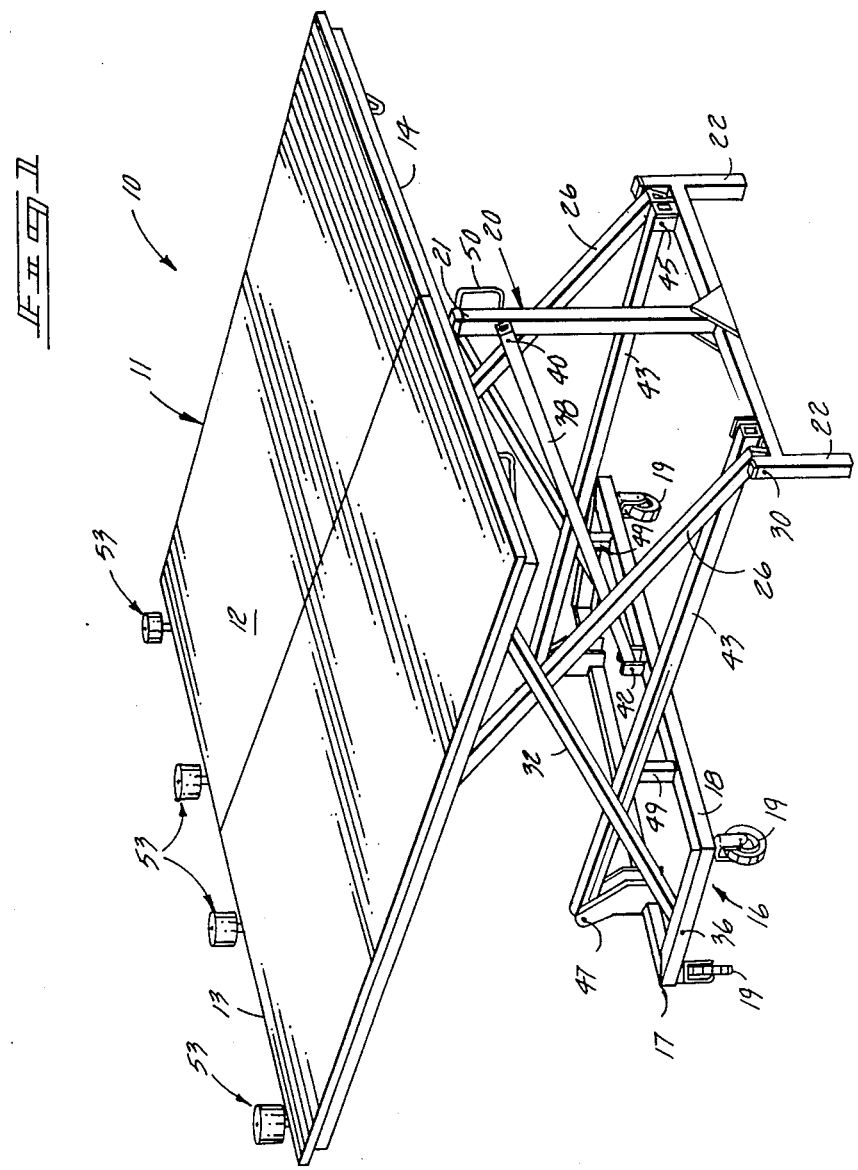
FIG. 1 is a perspective view of the present table with its tilt-top frame in a horizontal orientation.

The following disclosure of the invention is submitted in compliance with the constitutional purpose of the Patent Laws "to promote the progress of science and useful arts" (Article 1, Section 8).

The present tilt-top table is generally indicated in the drawings by the reference numeral 10. The tilt-top table 10 is intended for receiving and adjustably supporting heavy sheet material such as plate glass and for facilitating transport of the sheet material without requiring an excessive amount of manual handling.

The present tilt-top table may be constructed with various dimensions to suit the size and nature of material being supported.

The present table 10 includes a tilt-top frame 11 with an upper planar support surface 12. Surface 12 is shown as rectangular but could be other configurations. The preferred support surface includes a forward edge 13 spaced by a width dimension W from a rearward edge 14. In practice, a preferred width dimension for table tops used to support heavy sheet material such as plate glass is approximately 72 inches. The length dimension, transverse to the width dimension, is preferably approximately 96 inches for such pruposes.

The present table 10 also includes a primary support platform 16. The primary support platform is constructed of a rigid frame including a forward edge 17 and a rearward edge 18. A width dimension D of the primary support platform extends between the forward and rearward edges 17, 18. The width dimension D is substantially less than the table top width dimension W to minimize the overall width of the entire unit when folded to the transport and storage condition shown in FIGS. 4 and 9. In fact, the dimension D is advantageously less than one half of the table width W.

Figure 4:
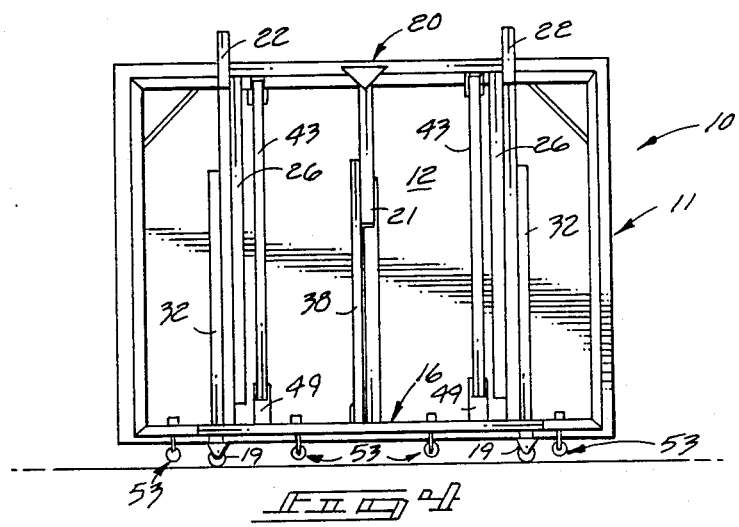
FIG. 4 is a side elevation view with the table and frame components shown in upright orientation.

The platform 16 is preferably supported by caster wheels 19 to facilitate transport when the entire table is folded up to its storage and transport condition as illustrated in FIGS. 4 and 9.

Figure 3:
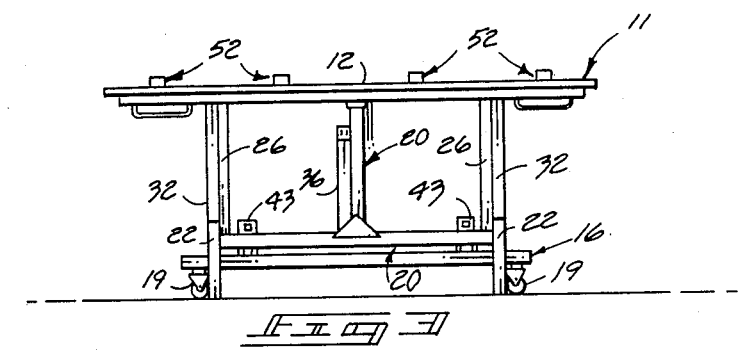
FIG. 3 is a side elevation view on a reduced scale as seen from the right in FIG. 1.

A secondary support brace 20 is provided to facilitate support of the table top frame 11 adjacent its rearward edge 14 when in its horizontal, operative position as shown in FIGS. 1, 3 and 6. The secondary support brace includes a top end 21 for contact with the tilt-top frame 11 in the operative position, and a pair of spaced legs 22 for contact with the ground or floor surface.

The tilt-top frame 11, primary support platform 16, and secondary support brace 20 are interconnected by a linkage means generally shown at 25. Linkage 25 facilitates individual pivotal adjustment of the tilt-top frame 11 and secondary support brace 20 in a first storage and transport position (FIG. 9) where the top frame and secondary support are oriented in compact substantially upright positions elevationally above the primary platform and substantially within the width dimension D thereof.

Actually, the top frame 11 is tilted slightly (preferably about 7° from vertical) to secure sheet material on its surface 12 and to reduce the overall height of the table unit. Linkage means 25 also supports the tilt-top frame 11 and secondary support brace 20 for independent movement to second positions wherein the tilt-top frame 11 is substantially horizontal and the secondary support brace 20 is spaced horizontally from the primayy platform as shown by FIGS. 1, 3, and 6. In both positions, the forward edges 13, 17 of the tilt-top frame 11 and platform 16 are adjacent a vertical plane P as indicated in FIGS. 6 and 7.

Figure 2:
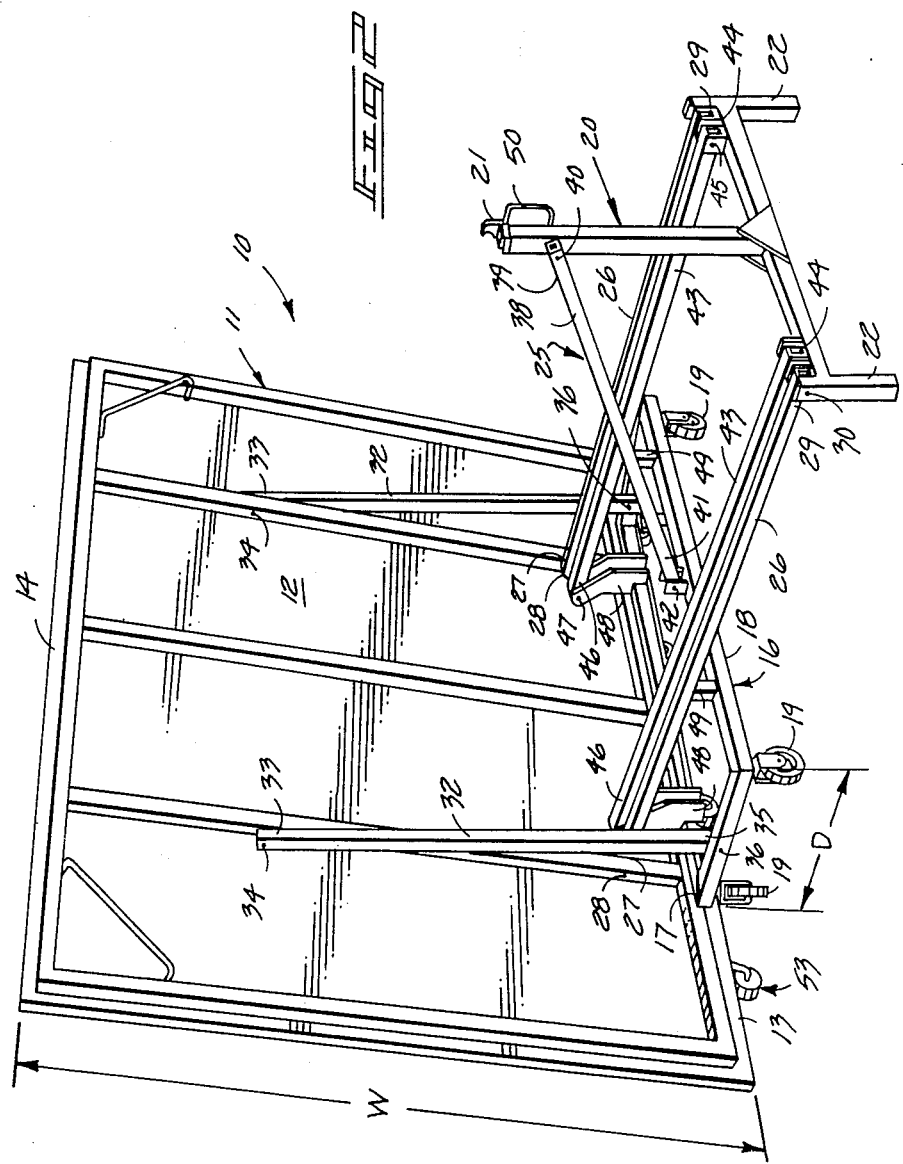
FIG. 2 is a view similar to FIG. 1 only showing the table top frame pivoted to an upright orientation.

The linkage means 25 may best be described with particular emphasis on FIGS. 2 and 4. The individual components of the linkage means are clearly shown in these figures.

Linkage means 25 includes a first pair of leg rails 26. The leg rails 26 extend between top ends 27 and bottom ends 29. The top ends 27 are mounted at pivots 28 to the tilt-top frame 11 adjacent its forward edge 13. The bottom ends 29 are pivotably connected at 30 to the secondary support brace 20.

Linkage means 25 also includes second leg rails 32. Second leg rails 32 extend from top ends 33 to bottom ends 35. The top ends 33 are mounted at pivots 34 to the top frame 11. The pivots 34 are spaced toward the rearward table edge 14 from the pivots 28. The bottom ends 35 are connected at pivots 36 to the primary support platform 16. The pivots 36 are situated on the support platform adjacent its forward edge 17.

A single arm 38 includes a first end 39 that is mounted at pivot 40 to the secondary support 20. Location of the pivot 40 is adjacent the top end 21 of the secondary support brace. The second end 41 of single arm 38 is mounted at a pivot 42 on the primary support platform 16. The pivot 42 is situated adjacent the rearward edge 18 of the primary support platform and centered along the length dimension of the platform.

A pair of secondary brace swing arms 43 are connected between the secondary support brace 20 and the primary support platform 16. The swing arms 43 include ends 44 mounted at pivots 45 to the secondary support base 20. The pivot axes for pivots 45 and pivots 30 are preferably coaxial. Swing arms 43 also include ends 46 mounted at pivots 47 to upstanding brackets 48 on the primary support platform 16. The pivot axes of pivots 47 and pivots 28 are preferably substantially coaxial when the tilt-top frame is in its upright position as shown in FIG. 2.

The arm 38 and swing arms 43 are provided as means mounting the secondary support to the primary platform for movement between the compact storage and transport condition (FIG. 9) and the horizontal operative condition (FIGS. 1, 3, 6).

Braces 49 are provided on the primary support platform 16 for engaging the swing arms 43 when in their extended, substantially horizontal orientation (FIGS. 1, 2, 6, 7). The braces 49 engage the arms 43 in this position to brace the platform against tipping on its wheels 19 as the tilt top frame is pivoted to and from its upright orientation. The arms and secondary support are thus used in this situation, as an "outrigger" to stabilize the narrow platform 16 as the tilt-top frame and its load are shifted between the FIG. 6 and FIG. 7 positions.

It is significant to note the relationship of the tilt-top frame 11, the primary support platform 16, and the secondary support brace 20 in the storage and transport position (FIG. 9). The tilt-top and the secondary support brace are both situated substantially within the overall width dimension D of the primary support platform. The small overall width dimension of the entire unit facilitates storage when not in use and enables transport of the table and any work pieces held thereon through narrow aisles and through conventional door openings. In fact, with the table configuration briefly discussed above, the geometry can be provided such that the overall height dimension H (FIG. 9), from the floor to the upwardmost end of the assembly when situated in the storage and transport condition, is less than the height of a standard doorway (80 inches). Furthermore, the overall unit width dimension is less than a standard doorway dimension (28 inches) to facilitate transport of the sheet material through such doorways and other narrow, confined spaces.

The individual pivotal movement of the top frame 11 and the secondary support brace is made possible in the preferred form, through alignment of the first leg rails 26 with the swing arms 43 and the coaxial nature of their respective pivots. Pivots 30 and 45 are coaxial, and pivots 28 and 47 are likewise coaxial when the unit is in the positions shown in FIGS. 2 and 7-9. With the rails 26 and arms 43 parallel and with the pivots at the rail and arm ends coaxial, it is possible to pivot the secondary support brace between the FIG. 7 and FIG. 9 positions independently of the tilt top frame 11. The secondary support brace can thus be moved to its outboard position, in order to expand the linkage means 25 into the configuration shown.

Ordinarily, the width dimension D of the primary support platform would be insufficient to provide stability for the table top frame 11 when in its horizontal orientation. However, the independently foldable secondary support brace 20, swing arms 43 and first leg rails 26 are selectively pivotable from the FIG. 9 position to the position shown in FIGS. 2 and 7 to facilitate weight transfer of the table top as it is shifted from the upright orientation shown in FIG. 7 to the horizontal condition shown in FIG. 6. This wide "stance" provided by the primary support platform and the extended secondary support brace 20 separates the pivots 36 and 30 beyond the width dimension D to facilitate even, progressive weight distribution of the tilt-top frame 11 as it is shifted between the two extreme positions shown in FIGS. 6 and 7.

Figure 5:
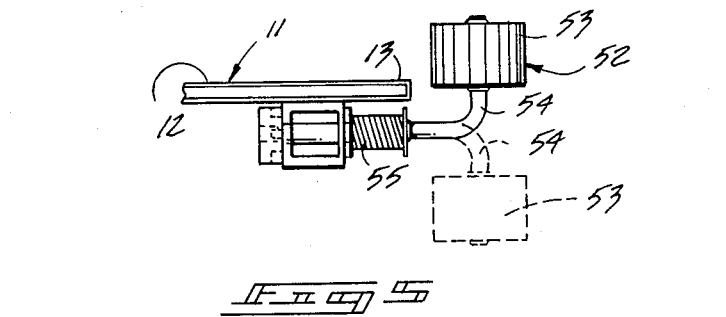
FIG. 5 is a detail view of a support roller mechanism for receiving and movably supporting sheet material when the table is in its upright orientation.

Another important feature of the present invention is a sheet material support means 52. The sheet material support means 52 is provided for movably receiving and supporting sheet material when the tilt-top frame 11 is in its first, upright orientation. Means 52 is comprised of a number of rollers 53 spaced along the tilt-top frame 11 adjacent its forward edge 13. The rollers 53 rotate to freely receive an edge surface of the sheet material, movably supporting the sheet material as it is pushed or pulled from a storage rack or other support (not shown). The individual rollers 53 are mounted by arms 54 and spring release mechanisms 55. Arms 54 and mechanisms 55 function as means mounting the rollers 53 to the tilt-top frame 11 for selective positioning between operative positions (solid lines, FIG. 5) and inoperative positions (dashed lines, FIG. 5). In the operative positions, the rollers 53 project outwardly from the planar support surface 12 substantially as shown in FIG. 5 and in the operational views shown in FIGS. 6-9. The rollers 53 can function to freely receive and movably support sheets being moved edgewise onto the present table. The rollers 53 can also be pivoted (dashed lines, FIG. 5) to facilitate unobstructed access to the support surface 12 when the tilt-top frame 11 is situated in the horizontal, operative position shown in FIGS. 1, 3, and 6.

A latching mechanism 50 may be provided adjacent the top end 21 of the secondary support brace 20. The latch mechanism 50 may be a simple spring actuated latch decide for securing and locking the table top to the secondary support brace when in its operative, horizontal orientation.

From the above technical description, operation of the invention may now be understood.

Operation of the invention will be described beginning with the table oriented in the first or upright storage and transport position as indicated in FIGS. 4 and 9. With the components arranged in this orientation, the table is fully maneuverable to bring it into position adjacent a standard sheet material storage rack. The orientation of the tilt-top frame 11 and the location of the rollers 53 is such as to substantially simulate the standard orientation of upright sheet materials supported in standard storage racks (not shown).

The table 10 is simply moved into position adjacent the end of a rack so one or more sheets can be easily moved along edges thereof from the rack onto the rollers 53. The rollers will rotate freely, supporting the load as the sheet material is moved along to a position where the sheet is substantially centered along the support surface 12. The sheet can then be allowed to tip onto the slightly inclined support surface 12. The entire weight of the sheet or sheets of material is now borne by the table 10.

The table and supported sheets of material can now be easily transported from the bin location to a desired site. This may mean moving the table on its wheels 19 from a warehouse, for example, to a work site. The narrow width of the table enables a worker to simply move the table 10 and work piece supported thereon along from the bin area through narrow, confined aisles and doorways up a standard ramp to the back of a transport vehicle such as a truck. The table can likewise be used to transport the sheet from the truck to its final destination. The narrow overall width dimension of the table 10 as indicated above facilitates such transport due to the compact nature of the table components in this orientation. In fact, transport may be achieved without requiring manual handling of the sheet material, other than initial loading, at any point from the storage bin to the installation site. The table will facilitate transport through conventional doorways, elevators, loading ramps, etc. and thereby minimize the dangerous handling of sheet material, (especially plate glass) from the storage site to, say, a construction site.

It is a simple task to shift the table from the first storage, transport orientation. This action begins by first shifting the secondary support brace 20 from the upright storage and transport orientation shown in FIG. 9 to the outward, operative position shown in FIGS. 2 and 7. This may be accomplished simply by pressing inwardly at the pivot 40, to urge brace 20 and arm 38 from the substantially over-center orientation indicated in FIG. 9 to the orientation shown in FIG. 8. The secondary support brace 20 will then swing on radii defined by the arm 38, the swing arms 43, and the first leg rails 26. It is noted that the secondary support brace 20 will progressively right itself from the inverted position shown in FIGS. 4 and 9 to the ultimate operative position shown in FIG. 7. This is due to the geometry of the arms and rails connecting the brace to the primary platform and tilt-top frame 11.

The secondary support brace 20 will swing relatively freely from the "unlocked" position substantially shown in FIG. 8 to the operative position shown in FIG. 7. During this motion, there is no disturbance or shifting of the work piece weight from the primary support platform. The worker is concerned only with the pivoted weight of the arm 38, arms 43 and the secondary support brace 20 while moving the secondary support between these positions.

The secondary support brace 20 is ready in the position shown in FIG. 7 to receive and assist the platform 16 in supporting the tilt-top frame and the work piece supported thereon. The secondary support is now situated outboard of the primary platform to locate the pivots 30 away from pivots 36 on the platform 16. This is done to facilitate balanced weight transfer of the workpiece and tilt-top frame 11 through the linkage means 25 between the platform 16 and secondary support brace 20.

The tilt-top frame 11 may now be swung from the upright condition shown in FIG. 7 to the substantially horizontal condition shown in FIG. 6. The "scissors" leverage action of the first and second leg rails 26, 32 during this motion thus provides the similar weight transfer advantage as utilized in known "scissors" forms of tilt-top tables. Shifting of the tilt-top table from the horizontal, operative position back to the upright, storage and transport position is accomplished simply by reversing the steps described above.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A tilt-top table, comprising:
    a top frame;
    a primary platform having a width dimension;
    a secondary support;
    linkage means interconnecting the top frame, the secondary support and the primary platform for enabling the top frame and secondary support to pivot relative to the primary platform between (a) a first position wherein the top frame and secondary support are oriented in compact substantially upright positions overlying and supported by the primary platform substantially within the width dimension thereof, and (b) a second position wherein the top frame is substantially horizontal, and the secondary support is spaced horizontally from the primary platform, and is positioned to engage and provide support to top frame; and wherein the linkage means includes a first leg rail having a top end pivotably connected to the top frame and a bottom end pivotably connected to the secondary support, and a second leg rail having a top end pivotably connected to the top frame and a bottom end pivotably connected to the primary support platform.

2. The tilt-top table of claim 1 wherein the top frame includes a top frame width dimension between the forward and rearward frame edges;

wherein the width dimension of the primary platform extends between the forward and rearward platform edges;

wherein the top frame width dimension is greater than twice the primary platform width dimension; and wherein the front edges of the top frame and the primary platform are adjacent a common vertical plane in the first and second positions.

3. A tilt-top table, comprising:
a top frame having a forward and a rearward edge;
a primary platform having width dimension between a forward and a rearward edge;
a secondary support
a pair of first leg rails each having a top end connected to the top frame adjacent the forward edge thereof for pivotal movement about a forward table axis, and a bottom end connected to the secondary support for pivotal movement about a secondary support axis;
a pair of second leg rails each having a top end connected to the top frame between the forward table axis and the rearward top frame edge for pivotal movement about a rearward table axis, and a bottom end connected to the primary platform for pivotal movement about a primary platform axis;
means mounting the secondary support to the primary platform for pivotal movement relative to the primary platform between a compact folded storage position spaced elevationally over the primary platform within the width dimension thereof and an operative position spaced substantially horizontally from the rearward primary platform edge; and
wherein the top frame is pivotable on the first and second leg rails in relation to the primary platform from (a) an upright storage condition wherein the forward top frame edge is adjacent the forward edge of the primary platform and the rearward top frame edge is adjacent the secondary support in its storage position, to (b) a substantially horizontal condition overlying the primary platform and the secondary support in its operative position.

4. A tilt-top table, comprising:
a top frame having a forward and a rearward edge;
a primary platform having width dimension between a forward and a rearward edge;
a secondary support having a top and a bottom end;
at least one first leg rail having a top end pivotably connected to the top frame adjacent the forward edge thereof and a bottom end pivotably connected to the secondary supports;
at least one second leg rail having a top end pivotably connected to the top frame between the top end of the first leg rail and the rearward top frame edge and a bottom end pivotably connected to the primary platform;

an arm having a first end pivotably mounted to the secondary suport adjacent the top end thereof, and a second end pivotably mounted to the primary platform;

at least one swing arm having one end pivotably mounted to the secondary support adjacent the bottom end thereof, and a remaining end pivotably mounted to the primary platform;

wherein the arm and swing arm mount the secondary support to the primary platform for pivotal movement relative to the primary platform between a compact folded storage position spaced elevationally over the primary platform within the width dimension thereof and an operative position spaced substantially horizontally from the rearward primary platform edge; and wherein the top frame is pivotable on the first and second leg rails in relation to the primary platform from (a) an upright storage condition wherein the forward top frame edge is adjacent the forward edge of the primary platform and the rearward top frame edge is adjacent the secondary support in its storage position, to (b) a substantially horizontal condition overlying the primary platform and the secondary support in its operative position.

5. The tilt-top table of claim 4 wherein the top frame includes a top frame width dimension between the forward and rearward frame edges;

wherein the width dimension of the primary platform extends between the forward and rearward platform edges;

wherein the top frame width dimension is greater than twice the primary platform width dimension; and wherein the front edges of the top frame and the primary platform are adjacent a common vertical plane in the first and second positions.

6. A tilt-top table, comprising:
a table top frame;
a primary platform;
a secondary support;
arms mounting the secondary support to the primary platform for pivotal movement between a storage condition spaced elevationally over the primary platform, and an operative condition spaced substantially horizontally from the primary platform;
rails mounting the table top frame to the primary platform and secondary support for movement between an upright storage condition and a substantially horizontal condition overlying the primary platform, with the secondary support remaining in the operative condition thereof.

7. The tilt-top table of claim 6 wherein the top frame includes forward and rearward edges and a top frame width dimension between the forward and rearward frame edges;

wherein the primary platform includes forward and rearward edges and with a width dimension of the primary platform extends the forward and rearward platform edges;

wherein the top frame width dimension is greater than twice the primary platform width dimension.

8. The tilt top table of claim 7 wherein the table top frame, the secondary support, and the rails and arms when in the storage conditions are all elevationally above and substantially confined to a space within the width dimension of the primary platform.

9. The tilt top table of claim 6 wherein the table top frame is a unitized rigid structure.

10. The tilt top table of claim 6 wherein the secondary support includes a top end and a bottom end and wherein the table top frame rests on the top end of the secondary support when the top frame is in the horizontal condition and wherein the top end of the secondary support is spaced clear of the top frame when the top frame is in the upright storage condition.

11. The tilt top table of claim 10 further comprising a latching mechanism at the top end of the secondary support engageable with the table top frame to releasably lock the table top frame to the secondary support when the table top frame is in the horizontal condition.

12. The tilt top table of claim 6 wherein the arms include ends pivotably mounted the secondary support to the primary platform in such a manner that the secondary support is upright in its operative condition and inverted in its storage condition.

13. The tilt top table of claim 6 wherein the rails include ends pivotably mounted to the primary platform, the secondary support and the table top frame at positions thereon to enable balanced weight transfer of the table top frame over the primary platform and secondary support as the table top frame is moved between the upright storage and the horizontal conditions thereof.

* * * * *